United States Patent
Komai et al.

(10) Patent No.: US 12,227,825 B2
(45) Date of Patent: Feb. 18, 2025

(54) STAINLESS STEEL POWDERS FOR ADDITIVE MANUFACTURING (71) Applicant: QUESTEK INNOVATIONS LLC, Evanston, IL (US)

(72) Inventors: Ricardo Komai, Evanston, IL (US); Abhinav Saboo, Evanston, IL (US); Marie Thomas, Evanston, IL (US); Dana Frankel, Evanston, IL (US)

(73) Assignee: QUESTEK INNOVATIONS LLC, Evanston, IL (US)

( * ) Notice: Subject to any disclaimer, the term of this patent is extended or adjusted under 35 U.S.C. 154(b) by 0 days.

(21) Appl. No.: 17/371,455

(22) Filed: Jul. 9, 2021

(65) Prior Publication Data
US 2022/0081745 A1 Mar. 17, 2022

Related U.S. Application Data (60) Provisional application No. 63/077,231, filed on Sep. 11, 2020.

(51) Int. Cl.
C22C 38/48 (2006.01)
B22F 9/08 (2006.01)
(Continued)

(52) U.S. Cl.
CPC .............. C22C 38/48 (2013.01); B22F 9/08 (2013.01); B22F 10/28 (2021.01); B33Y 10/00 (2014.12);
(Continued)

(58) Field of Classification Search
CPC ..... C22C 38/48; C22C 38/42; C22C 33/0285; C22C 38/50; B22F 9/08; B22F 10/28;
(Continued)

(56) References Cited

U.S. PATENT DOCUMENTS

2003/0049153 A1* 3/2003 Martin .................. C22C 38/004
420/38
2009/0047165 A1* 2/2009 Syvanen ................ B33Y 70/00
420/60

(Continued)

FOREIGN PATENT DOCUMENTS

EP 1992709 A1 11/2008
EP 3121306 A1 1/2017
(Continued)

OTHER PUBLICATIONS

Ghosh et al., "Kinetics of F.C.C.→B.C.C. Heterogeneous Martensitic Nucleation—I. The Critical Driving Force for Athermal Nucleation", Acta Metall. Mater., vol. 42, 1994, pp. 3361-3370.
(Continued)

Primary Examiner — John A Hevey
(74) Attorney, Agent, or Firm — Michael Best & Friedrich LLP (57) ABSTRACT Exemplary alloys may be particularly suited for additive manufacturing applications, and may comprise iron and one or more of: chromium (Cr), nickel (Ni), carbon (C), and copper (Cu). Exemplary alloys may have a majority microstructure that is martensite.

6 Claims, 7 Drawing Sheets (51) Int. Cl.
- *B22F 10/28* (2021.01)
- *B33Y 10/00* (2015.01)
- *B33Y 70/00* (2020.01)
- *B33Y 80/00* (2015.01)
- *C21D 9/00* (2006.01)
- *C22C 38/42* (2006.01)

(52) U.S. Cl.
CPC ............ *B33Y 70/00* (2014.12); *C21D 9/0068* (2013.01); *C22C 38/42* (2013.01); *B22F 2301/35* (2013.01); *B33Y 80/00* (2014.12); *C21D 2211/008* (2013.01)

(58) Field of Classification Search
CPC .. B22F 2301/35; B22F 2998/10; B22F 10/60; B22F 10/64; B22F 1/0003; B33Y 10/00; B33Y 70/00; B33Y 80/00; B33Y 40/20; C21D 9/0068; C21D 2211/008; C21D 6/004; Y02P 10/25
See application file for complete search history.

(56) References Cited

U.S. PATENT DOCUMENTS

| | | | |
|---|---|---|---|
| 2016/0333450 A1* | 11/2016 | Ikeda | C22C 38/06 |
| 2018/0119239 A1* | 5/2018 | Tuffile | B22F 10/64 |
| 2019/0160595 A1 | 5/2019 | Narayanan et al. | |
| 2021/0138543 A1* | 5/2021 | Maskrot | C22C 38/40 |

FOREIGN PATENT DOCUMENTS

| | | |
|---|---|---|
| JP | S63171857 A | 7/1988 |
| JP | H10102105 A | 4/1998 |
| JP | 2015189981 A | 11/2015 |
| JP | 2017025392 A | 2/2017 |
| JP | 2018178144 A | 11/2018 |
| WO | 8704731 A1 | 8/1987 |
| WO | 01031076 A1 | 5/2001 |
| WO | 2021123894 A1 | 6/2021 |

OTHER PUBLICATIONS

Meier et al., "Critical Influences of Particle Size and Adhesion on the Powder Layer Uniformity in Metal Additive Manufacturing", arXiv, 2018, 27 pages.

Mindt et al., "Powder bed layer characteristics: the overseen first-order process input", Metallurgical and Materials Transactions A, vol. 47, No. 8, 2016, pp. 3811-3822.

Vunnam et al., "Effect of powder chemical composition on the as-built microstructure of 17-4 PH stainless steel processed by selective laser melting", Additive Manufacturing, vol. 30, 2019, 12 pages.

European Patent Office Extended Search Report for Application No. 21184876.7 dated Oct. 11, 2021 (12 pages).

Schaller et al., "Corrision Properties of Powder Bed Fusion Additively Manufactured 17-4 PH Stainless Steel", Corrision, National Association of Corrision Engineers, 2017, vol. 73, No. 1, pp. 796-807.

Japanese Patent Office Notice of Reasons for Refusal for Application No. 2021114014 dated Nov. 2, 2022 (10 pages including English translation).

Pasebani et al., "Effects of atomizing media and post processing on mechanical properties of 17-4 PH stainless steel manufactured via selective laser melting," Additive Manufacturing, 2018, 127-137.

Salama et al., "Distinct properties of tungsten austenitic stainless alloy as a potential nuclear engineering material," Nuclear Engineering and Technology, 2019, 51: 784-791.

Stainless Steel Precipitation hardening 15-5PH (Year: 2019).

\* cited by examiner

STAINLESS STEEL POWDERS FOR ADDITIVE MANUFACTURING

CROSS-REFERENCE TO RELATED APPLICATION(S)

This application claims priority to U.S. Provisional Patent Application No. 63/077,231 filed on Sep. 11, 2020, the entire contents of which are incorporated herein by reference.

GOVERNMENT INTEREST

This invention was made with government support under contract number N68335-18-C-0020 awarded by the U.S. Department of Defense. The government has certain rights in the invention.

TECHNICAL FIELD

The present disclosure relates to materials, methods and techniques for stainless steel alloys. More particularly, exemplary stainless steel alloys are suited for additive manufacturing implementations.

INTRODUCTION

Additive manufacturing (AM) is a process of fabricating components in a layer-by-layer method under the control of computer-aided design (CAD) information, rather than by the traditional use of casting molds and forming dies. Additive manufacturing technologies such as Selective Laser Melting (SLM), also known as Laser Powder Bed Fusion (LPBF), have matured significantly in recent years.

By allowing for net-shape fabrication of highly complex geometries without molds or machining, additive manufacturing offers the potential to reduce material usage, energy consumption, component cost, and fabrication time. Additive manufacturing allows for rapid component production, one-off production of difficult-to-source parts, and production of parts difficult to produce by conventional means (such as complex geometries that cannot be machined or cast). As a result, additive manufacturing can provide flexibility in part manufacturing to original equipment manufacturers as well as end users acquiring custom or replacement parts.

SUMMARY

Materials, methods and techniques disclosed and contemplated herein relate to steel alloys that are particularly adapted for additive manufacturing applications. In some instances, steel alloys may comprise chromium, nickel, carbon, copper, and the balance iron and incidental elements and impurities.

In one aspect, an alloy is disclosed. The alloy may comprise, by weight percentage, 14.25% to 15.75% chromium; 2.90% to 5.0% nickel; 0.03% to 0.08% carbon; 2.90% to 4.50% copper; no more than 0.01% niobium; no more than 0.02% nitrogen; no more than 0.04% oxygen; and the balance of weight percent comprising iron and incidental elements and impurities.

In another aspect, an atomized alloy powder usable in additive manufacturing is disclosed. The atomized alloy powder may comprise alloy particles, where the alloy particles may comprise, by weight percentage, 14.25% to 15.75% chromium; 2.90% to 5.0% nickel; 0.03% to 0.08% carbon; 2.90% to 4.50% copper; no more than 1.00% manganese; no more than 0.01% niobium; no more than 0.02% nitrogen; no more than 0.04% oxygen; and the balance of weight percent comprising iron and incidental elements and impurities.

In another aspect, a method of using an atomized alloy powder in additive manufacturing is disclosed. The method may comprise receiving the atomized alloy powder comprising alloyed particles, where the alloyed particles may comprise, by weight percentage, 14.25% to 15.75% chromium; 2.90% to 5.0% nickel; 0.03% to 0.08% carbon; 2.90% to 4.50% copper; no more than 1.00% manganese; no more than 0.01% niobium; no more than 0.02% nitrogen; no more than 0.04% oxygen; and the balance of weight percent comprising iron and incidental elements and impurities.

There is no specific requirement that a material, technique or method relating to steel alloys include all of the details characterized herein, in order to obtain some benefit according to the present disclosure. Thus, the specific examples characterized herein are meant to be exemplary applications of the techniques described, and alternatives are possible.

DETAILED DESCRIPTION

Materials, methods and techniques disclosed and contemplated herein relate to stainless steel alloys. Alloys disclosed and contemplated herein may be particularly suited for additive manufacturing applications. For instance, an atomized alloy powder usable in additive manufacturing may comprise alloy particles comprising various alloys disclosed and contemplated herein.

Typically, exemplary alloys may be high-strength, martensitic precipitation-hardenable stainless steel. In some instances, exemplary alloys may be optimized for processing conditions and conditions associated with additive manufacturing processing, such as Laser Powder Bed Fusion (LPBF) additive manufacturing. In some instances, disclosed alloys may have improved additive manufacturing reliability and performance in both as-built and minimally-processed (i.e. direct aged) conditions, as compared to commercially available 17-4 powder.

I. Example Steel Alloys

Example steel alloys are described below regarding example components and amounts, phase and nanostructure characteristics, and physical properties. As discussed elsewhere, exemplary steel alloys are particularly suited for powder based additive manufacturing implementations.

A. Example Components and Amounts

Exemplary steel alloys disclosed and contemplated herein include various components at various amounts. For instance, example steel alloys may comprise iron and one or more of: chromium (Cr), nickel (Ni), carbon (C), and copper (Cu). In some instances, example steel alloys can additionally include one or more of: titanium (Ti), manganese (Mn), nitrogen (N), and oxygen (O).

Example steel alloys may include chromium. For instance, example steel alloys may comprise, by weight, 14.25% to 15.75% chromium (Cr). In various implementations, example steel alloys may comprise, by weight, 14.25% to 15% Cr; 15% to 15.75% Cr; 14.5% to 15.5% Cr; 14.25% to 14.75% Cr; 14.75% to 15.25% Cr; 15.25% to 15.75% Cr; 14.3% to 14.5% Cr; 14.5% to 14.7% Cr; 14.7% to 14.9% Cr; 14.9% to 15.1% Cr; 15.1% to 15.3% Cr; 15.3% to 15.5% Cr; or 15.5% to 15.7% Cr. In various implementations, example steel alloys may comprise, by weight, at least 14.25% Cr; at least 14.5% Cr; at least 14.75% Cr; at least 15.0% Cr; at least 15.25% Cr; or at least 15.5% Cr. In various implementations, example steel alloys may comprise, by weight, no more than 15.75% Cr; no more than 15.5% Cr; no more than 15.25% Cr; no more than 15.0% Cr; no more than 14.75% Cr; or no more than 14.5% Cr.

Example steel alloys may include nickel. For instance, exemplary steel alloys may comprise, by weight, 2.90% to 5.0% nickel (Ni). In various implementations, exemplary steel alloys may comprise, by weight, 2.9% to 5.0% Ni; 2.9% to 3.7% Ni; 3.7% to 5.0% Ni; 3.1% to 3.9% Ni; 2.9% to 3.5% Ni; 3.3% to 3.9% Ni; 3.1% to 3.7% Ni; 2.9% to 3.3% Ni; 3.3% to 3.7% Ni; 3.5% to 3.9% Ni; 2.9% to 3.1% Ni; 3.1% to 3.3% Ni; 3.3% to 3.5% Ni; 3.5% to 3.7% Ni; 3.7% to 3.9% Ni; 4.0% to 5.0% Ni; 4.0% to 4.5% Ni; 4.5% to 5.0% Ni; 4.25% to 4.75% Ni; 4.0% to 4.3% Ni; 4.3% to 4.7% Ni; 4.7% to 5.0% Ni; 4.0% to 4.2% Ni; 4.2% to 4.4% Ni; 4.4% to 4.6% Ni; 4.6% to 4.8% Ni; or 4.8% to 5.0% Ni. In various implementations, example steel alloys may comprise, by weight, at least 2.9% Ni; at least 3.25% Ni; at least 3.5% Ni; at least 3.75% Ni; at least 4.0% Ni; at least 4.5% Ni; or at least 4.75% Ni. In various implementations, example steel alloys may comprise, by weight, no more than 5.0% Ni; no more than 4.75% Ni; no more than 4.5% Ni; no more than 4.25% Ni; no more than 4.0% Ni; no more than 3.75% Ni; no more than 3.5% Ni; no more than 3.25% Ni; or no more than 3.0% Ni.

Example steel alloys may include carbon. For instance, exemplary steel alloys may comprise, by weight, 0.03% to 0.08% carbon (C). In various implementations, exemplary steel alloys may comprise, by weight, 0.03% to 0.055% C; 0.055% to 0.08%; 0.04% to 0.08% C; 0.035% to 0.05% C; 0.05% to 0.07% C; 0.04% to 0.06% C; or 0.06% to 0.08% C. In various implementations, example steel alloys may comprise, by weight, at least 0.03% C; at least 0.05% C; or at least 0.07% C. In various implementations, example steel alloys may comprise, by weight, no more than 0.08% C; no more than 0.06% C; or no more than 0.04% C.

Example steel alloys may include copper. For instance, exemplary steel alloys may comprise, by weight, 2.90% to 4.50% copper (Cu). In various implementations, exemplary steel alloys may comprise, by weight, 2.9% to 3.7% Cu; 3.5% to 4.5% Cu; 3.1% to 3.9% Cu; 2.9% to 3.5% Cu; 3.3% to 3.9% Cu; 3.1% to 3.7% Cu; 2.9% to 3.3% Cu; 3.3% to 3.7% Cu; 3.5% to 3.9% Cu; 2.9% to 3.1% Cu; 3.1% to 3.3% Cu; 3.3% to 3.5% Cu; 3.5% to 3.7% Cu; or 3.7% to 3.9% Cu; 3.5% to 4.0% Cu; 4.0% to 4.5% Cu; 3.75% to 4.25% Cu; 3.9% to 4.1% Cu; 4.1% to 4.3% Cu; or 4.3% to 4.5% Cu. In various implementations, example steel alloys may comprise, by weight, at least 2.9% Cu; at least 3.25% Cu; at least 3.5% Cu; at least 3.75% Cu; at least 4.0% Cu; or at least 4.25% Cu. In various implementations, example steel alloys may comprise, by weight, no more than 4.5% Cu; no more than 4.25% Cu; no more than 4.0% Cu; no more than 3.75% Cu; no more than 3.5% Cu; no more than 3.25% Cu; or no more than 3.0% Cu.

In some implementations, example steel alloys may include titanium. When included, exemplary steel alloys may comprise, by weight, 0.01% to 0.31% titanium (Ti). In various implementations, exemplary steel alloys may comprise, by weight, 0.01% to 0.28% Ti; 0.04% to 0.31% Ti; 0.01% to 0.15% Ti; 0.15% to 0.31% Ti; 0.01% to 0.1% Ti; 0.1% to 0.2% Ti; 0.2% to 0.31% Ti; 0.07% to 0.18% Ti; 0.13% to 0.22% Ti; 0.18% to 0.26% Ti; 0.01% to 0.06% Ti; 0.06% to 0.11% Ti; 0.11% to 0.16% Ti; 0.16% to 0.21% Ti; 0.21% to 0.26% Ti; or 0.26% to 0.31% Ti. In various implementations, exemplary steel alloys may comprise at least 0.01% Ti; at least 0.1% Ti; at least 0.15% Ti; at least 0.2% Ti; or at least 0.25% Ti. In various implementations, exemplary steel alloys may comprise no more than 0.31% Ti; no more than 0.25% Ti; no more than 0.2% Ti; no more than 0.15% Ti; no more than 0.1% Ti; or no more than 0.05% Ti.

In some instances, example steel alloys may comprise, by weight, no more than 0.01% niobium; no more than 0.005% niobium, or no more than 0.001% niobium.

In some instances, example steel alloys may comprise, by weight, no more than 0.02% nitrogen, no more than 0.01% nitrogen, no more than 0.005% nitrogen; or no more than 0.001% nitrogen.

In some instances, example steel alloys may comprise, by weight, no more than 0.04% oxygen, no more than 0.02% oxygen; no more than 0.01% oxygen; no more than 0.005% oxygen; or no more than 0.001% oxygen.

In some instances, example steel alloys may comprise, by weight, no more than 0.01% tantalum, no more than 0.005% tantalum, or no more than 0.001% tantalum.

In some instances, example steel alloys may comprise, by weight, no more than 1.0% silicon; no more than 0.1% silicon; no more than 0.01% silicon, no more than 0.005% silicon, or no more than 0.001% silicon.

In some instances, example steel alloys may comprise, by weight, no more than 1.0% manganese; no more than 0.5% manganese; no more than 0.1% manganese; no more than 0.01% manganese, no more than 0.005% manganese, or no more than 0.001% manganese.

In some instances, example steel alloys may include one or more incidental elements and impurities. Incidental elements and impurities in the disclosed steel alloys may include, but are not limited to, silicon, phosphorous, sulfur, manganese, elements adhering to raw material stock, or mixtures thereof. Excluding silicon and manganese, incidental elements and impurities may be present in the alloys disclosed herein in amounts totaling no more than 0.5 wt %; no more than 0.1 wt %, no more than 0.05 wt %, no more than 0.01 wt %, or no more than 0.001 wt %.

It is understood that the alloys described herein may consist only of the above-mentioned constituents, may consist essentially of such constituents, may comprise the above-mentioned constituents, or, in other embodiments, may include additional constituents.

Example steel alloys may have various ratios of nickel (Ni) to copper (Cu) (Ni/Cu), which may avoid hot shortness. Hot shortness may be defined as cracking of a material as the welded area cools and solidifies, and may be synonymous with hot tearing. For instance, in some implementations, a Ni/Cu ratio of example steel alloys may be no less than about 0.64 and no greater than about 1.73. In various instances, a Ni/Cu ratio of example steel alloys may be 0.64 to 1.73; 0.74 to 1.34; 0.9 to 1.1; 0.95 to 1.05; 1.0 to 1.2; 1.1 to 1.2; or 0.89 to 1.43. In various instances, a Ni/Cu ratio of example steel alloys may be no less than 0.64; no less than 0.74; no less than 0.9; no less than 1.0; no less than 1.1; no less than 1.2; no less than 1.3; no less than 1.5; or no less than 1.7. In various instances, a Ni/Cu ratio of example steel alloys may be no greater than 1.73; no greater than 1.5; no greater than 1.43; no greater than 1.35; no greater than 1.2; no greater than 1.1; no greater than 1.0; or no greater than 0.8.

Example steel alloys may have various ratios of chromium (Cr) to nickel (Ni), Cr/Ni. For example, exemplary steel alloys may have a ratio of Cr/Ni of about 2.85 to about 5.4. In various instances, exemplary steel alloys may have a ratio of Cr/Ni of 2.85 to 5.4; 3.5 to 5.4; 2.85 to 4.0; 4.0 to 5.0; 4.2 to 4.6; 3.0 to 4.0; or 3.1 to 3.5. In various instances, exemplary steel alloys may have a ratio of Cr/Ni of at least 2.85; at least 3.1; at least 3.3; at least 3.5; at least 4.0; at least 4.25; at least 4.5; at least 4.75; at least 5.0; or at least 5.25. In various instances, exemplary steel alloys may have a ratio of Cr/Ni of no greater than 5.4; no greater than 5.0; no greater than 4.8; no greater than 4.6; no greater than 4.2; no greater than 4.0; no greater than 3.75; no greater than 3.5; no greater than 3.25; or no greater than 3.0.

Example steel alloys may comprise components discussed above in various combinations of amounts. For instance, example steel alloys may comprise, by weight, 14.25% to 15.75% chromium; 2.90% to 3.90% nickel; 0.03% to 0.07% carbon; 2.90% to 3.90% copper; 0.01% to 0.31% titanium; no more than 1.00% manganese; no more than 0.01% niobium; no more than 0.02% nitrogen; no more than 0.04% oxygen, and the balance of weight percent comprising iron and incidental elements and impurities. In some instances, example steel alloys may comprise, by weight, 14.25% to 15.75% chromium; 2.90% to 3.90% nickel; 0.03% to 0.07% carbon; 2.90% to 3.90% copper; 0.01% to 0.31% titanium; no more than 0.50% manganese; no more than 0.01% niobium; no more than 0.02% nitrogen; no more than 0.04% oxygen, and the balance of weight percent comprising iron and incidental elements and impurities. In some instances, example steel alloys may comprise, by weight, 14.75% to 15.25% chromium; 3.10% to 3.70% nickel; 0.035% to 0.05% carbon; 3.10% to 3.70% copper; 0.10% to 0.20% titanium; no more than 1.00% manganese; no more than 0.01% niobium; no more than 0.02% nitrogen; no more than 0.04% oxygen, and the balance of weight percent comprising iron and incidental elements and impurities. In some instances, example steel alloys may comprise, by weight, 14.25% to 15.75% chromium; 2.90% to 5.0% nickel; 0.03% to 0.08% carbon; 2.90% to 4.50% copper; no more than 1.00% manganese; no more than 0.01% niobium; no more than 0.02% nitrogen; no more than 0.04% oxygen, and the balance of weight percent comprising iron and incidental elements and impurities. In some instances, example steel alloys may comprise, by weight, 14.7% to 15.5% chromium, 4.0% to 5.0% nickel; 0.04% to 0.08% carbon, 3.5% to 4.5% copper; less than 0.01% titanium, and the balance of weight percent comprising iron and incidental elements and impurities. In some instances, example steel alloys may comprise, by weight, 14.7% to 15.5% chromium, 2.9% to 3.9% nickel; 0.03% to 0.07% carbon, 2.9% to 3.9% copper; and 0.05% to 0.25% titanium, and the balance of weight percent comprising iron and incidental elements and impurities. Other amounts are contemplated.

B. Example Phase and Nanostructure Characteristics

Exemplary alloys may have various phase and microstructure characteristics in powder form, after being subjected to an additive manufacturing process (also referred to as "as-built"), and after direct aging (described below).

Certain instances of exemplary steel alloys have, relative to a 17-4 alloy, increased martensite start temperature ($M_s$). Certain instances of exemplary steel alloys have lower δ-ferrite stability to promote martensite formation. Certain instances of exemplary steel alloys can accommodate impurity content of nitrogen from N-atomization via formation of MX-type carbonitrides, but can also accommodate oxygen with the substitution of Ti for Nb in order to promote formation of refined $TiO_2$ particles. Certain instances of exemplary steel alloys can promote formation of nitrides and oxides which may assist with producing more uniform grain structure and a disruption to the columnar, epitaxial growth of grains in typical additive manufacturing.

In some instances, after being subjected to an additive manufacturing process exemplary alloys may have a majority martensitic structure. Majority, as used herein, means at least 50% of the microstructure. Exemplary alloys can also include minor amounts of δ-ferrite and γ-austenite.

Exemplary alloys, after being subjected to an additive manufacturing process and after aging at 482° C. (±8.5° C.) for 1 hour, may have a microstructure that is at least 75% martensite; at least 77% martensite; at least 79% martensite; at least 80% martensite; at least 85% martensite; at least 90% martensite; at least 91% martensite; at least 92% martensite; or at least 93% martensite.

Exemplary alloys, after being subjected to an additive manufacturing process and after aging at 482° C. (±8.5° C.) for 1 hour, may have a microstructure that is less than 20% δ-ferrite; less than 18% δ-ferrite; less than 16% δ-ferrite; less than 14% δ-ferrite; less than 12% δ-ferrite; less than 10% δ-ferrite; or less than 6% δ-ferrite.

C. Example Mechanical Properties

Exemplary alloys may have various mechanical properties in powder form, after being subjected to an additive manufacturing process (also referred to as "as-built"), and after direct aging and/or solutionizing. Various mechanical properties below are described in terms of x-y specimens, where the long axis of tensile specimens was parallel to the build plate, and z-specimens, where the long axis of tensile specimens was perpendicular to the build plate and tested in tension.

1. Example As-built Mechanical Properties

Example alloys may have various yield strength properties in as-built form, which means after being subjected to an additive manufacturing process that may be laser powder bed fusion (LPB-F), and without performing any aging or solution heat treatment.

For instance, exemplary alloys in as-built form may have a yield strength, 0.2% elastic offset, for z-specimens, of about 850 MPa to about 1015 MPa. In various implementations, exemplary alloys in as-built form may have a yield strength for z-specimens, of 850 MPa to 1015 MPa; 900 MPa to 1010 MPa; 950 MPa to 1005 MPa; 960 MPa to 1005 MPa; or 975 MPa to 1005 MPa. In various implementations, exemplary alloys in as-built form may have a yield strength for z-specimens, of at least 850 MPa; at least 900 MPa; at least 950 MPa; at least 960 MPa; at least 970 MPa; at least 990 MPa; or at least 1000 MPa. In various implementations, exemplary alloys in as-built form may have a yield strength, for z-specimens, of no more than 1000 MPa; no more than 975 MPa; no more than 960 MPa; no more than 950 MPa; no more than 900 MPa; or no more than 850 MPa.

Exemplary alloys in as-built form may have a yield strength, 0.2% elastic offset, for x-y-specimens, of about 800 MPa to about 1080 MPa. In various implementations, exemplary alloys in as-built form may have a yield strength, for x-y-specimens, of 800 MPa to 1080 MPa; 850 MPa to 950 MPa; 1010 MPa to 1040 MPa; 1000 MPa to 1050 MPa; 860 MPa to 900 MPa; or 950 MPa to 1050 MPa. In various implementations, exemplary alloys in as-built form may have a yield strength, for x-y-specimens, of at least 800 MPa; at least 850 MPa; at least 875 MPa; at least 900 MPa; at least 925 MPa; at least 950 MPa; at least 975 MPa; at least 1000 MPa; at least 1025 MPa; or at least 1050 MPa. In various implementations, exemplary alloys in as-built form may have a yield strength, for x-y specimens, of no more than 1080 MPa; no more than 1050 MPa; no more than 1025 MPa; no more than 975 MPa; no more than 925 MPa; no more than 875 MPa; or no more than 825 MPa.

Exemplary alloys in as-built form may have a fatigue strength, after 10 million cycles, of about 475 MPa to about 525 MPa. In various implementations, exemplary alloys in as-built form may have a fatigue strength, after 10 million cycles, of 475 MPa to 525 MPa; 475 MPa to 500 MPa; 500 MPa to 525 MPa; 500 MPa to 525 MPa; or 480 MPa to 510 MPa. In various implementations, exemplary alloys in as-built form may have a fatigue strength, after 10 million cycles, of at least 475 MPa; at least 485 MPa; at least 495 MPa; at least 505 MPa; or at least 515 MPa. Om various implementations, exemplary alloys in as-built form may have a fatigue strength, after 10 million cycles, of no more than 525 MPa; no more than 510 MPa; no more than 500 MPa; no more than 490 MPa; or no more than 480 MPa.

2. Example Mechanical Properties after Aging and/or Solutionizing

Example alloys may have various yield strength properties in after additive manufacturing and direct aging and/or solutionizing.

For instance, exemplary alloys, after being subjected to an additive manufacturing process and after aging at 482° C. (±8.5° C.) for 1 hour and without solution heat treatment, may have a hardness value of 42 HRC to 48 HRC. In various implementations, exemplary alloys after being subjected to an additive manufacturing process and after aging at 482° C. (±8.5° C.) for 1 hour and without solution heat treatment, may have a hardness value of 42 HRC to 44 HRC; 44 HRC to 46 HRC; 46 HRC to 48 HRC; 42 HRC to 46 HRC; 44 HRC to 48 HRC; or 43 HRC to 47 HRC. In various instances, exemplary alloys after being subjected to an additive manufacturing process and after aging at 482° C. (±8.5° C.) for 1 hour and without solution heat treatment, may have a hardness value of at least 42 HRC; at least 44 HRC; at least 45 HRC; or at least 47 HRC.

For instance, exemplary alloys, after being subjected to an additive manufacturing process and without aging or solution heat treatment, may have a hardness value of 35 HRC to 40 HRC. In various implementations, exemplary alloys after being subjected to an additive manufacturing process and without aging or solution heat treatment, may have a hardness value of 35 HRC to 40 HRC; 36 HRC to 40 HRC; 37 HRC to 40 HRC; 35.5 HRC to 36.5 HRC; or 39 HRC to 40 HRC. In various implementations, exemplary alloys after being subjected to an additive manufacturing process and without aging or solution heat treatment, may have a hardness value of at least 35 HRC; at least 36 HRC; at least 37 HRC; at least 38 HRC; or at least 39 HRC.

Exemplary alloys, after being subjected to an additive manufacturing process and after aging at 482° C. (±8.5° C.) for 1 hour and without solution heat treatment, may have an ultimate tensile strength (z specimen) of 1400 MPa to 1460 MPa; 1410 MPa to 1420 MPa; 1450 MPa to 1455 MPa; 1455 MPa to 1460 MPa; 1450 MPa to 1453 MPa; 1453 MPa to 1456 MPa; or 1456 MPa to 1460 MPa. In various implementations, exemplary alloys, after being subjected to an additive manufacturing process and after aging at 482° C. (±8.5° C.) for 1 hour and without solution heat treatment, may have an ultimate tensile strength (z specimen) of at least 1400 MPa; at least 1410 MPa; at least 1430 MPa; at least 1450 MPa; or at least 1455 MPa. In various implementations, exemplary alloys, after being subjected to an additive manufacturing process and after aging at 482° C. (±8.5° C.) for 1 hour and without solution heat treatment, may have an ultimate tensile strength (z specimen) of no more than 1460 MPa; no more than 1455 MPa; no more than 1450 MPa; no more than 1425 MPa; no more than 1420 MPa; or no more than 1415 MPa.

Exemplary alloys, after being subjected to an additive manufacturing process and after aging at 482° C. (±8.5° C.) for 1 hour and with solution heat treatment, may have an ultimate tensile strength of 1456 MPa to 1516 MPa; 1456 MPa to 1486 MPa; 1486 MPa to 1516 MPa; 1456 MPa to 1476 MPa; 1476 MPa to 1496 MPa; or 1496 MPa to 1516 MPa.

Exemplary alloys, after being subjected to an additive manufacturing process and after aging at 482° C. (±8.5° C.) for 1 hour and without solution heat treatment, may have a total elongation of 8% to 16%; 8% to 10%; 10% to 14%; 11% to 13%; or 8% to 12%.

Exemplary alloys, after being subjected to an additive manufacturing process and after aging at 482° C. (±8.5° C.) for 1 hour and with solution heat treatment, may have a total elongation of 14.1% to 17.5%; 14.1% to 15.8%; 15.8% to 17.5%; 14.1% to 15.2%; 15.2% to 16.2%; or 16.2% to 17.5%.

II. Example Methods of Preparing Alloy Powders

Example steel alloys disclosed and contemplated herein may be fabricated into various input stock forms relevant to the additive manufacturing system of interest. For instance, example steel alloys disclosed and contemplated herein may be manufactured into atomized alloy powder using available atomization techniques such as inert gas atomization. Resulting atomized alloy powders may be used in powder-bed fusion and directed energy deposition systems.

An example method of manufacturing an atomized alloy powder includes melting elemental metal feedstock or pre-alloyed feedstock such that a desired chemistry is produced. In some combinations of elements disclosed above, when a desired chemistry reaches temperatures at or above temperatures where there is no solid material fraction in the melt, atomization processes should take place.

Example atomized alloy powders may have particles sized for a particular use and/or fabrication system. In some implementations, example atomized alloy powders include particles having diameters of from 15 μm to 45 μm.

III. Example Methods of Manufacture

Example steel alloys disclosed and contemplated herein may be used in additive manufacturing systems. Additive manufacturing is a process by which products are built in a layered fashion by selectively fusing metal using a computer-controlled energy source (e.g., laser, electron beam, weld torch, or the like). Additive manufacturing is also defined in ASTM F2792-12a entitled "Standard Terminology for Additively Manufacturing Technologies."

Example additive layer manufacturing processes include: selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. Suitable additive manufacturing systems include the EOSINT M 280 Direct Metal Laser Sintering (DMLS) additive manufacturing system, available from EOS GmbH (Robert-Stirling-Ring 1, 82152 Krailling/Munich, Germany).

In some implementations, direct metal laser sintering (DMLS) is used to produce articles comprising the disclosed and contemplated example steel alloys. During example processes, an atomized alloy powder may be spread in a bed and a laser is used to selectively melt and fuse regions of the bed. Articles of manufacture may be built in a layer-by-layer fashion by continually spreading and fusing layers of powder.

Various post-processing operations may be performed after the build process. In some instances, post-processing operations improve one or more characteristics of the "as-built" article of manufacture. Post-processing operations may comprise various heat treatments.

As an example, "direct aging" may be performed on a manufactured article. Direct aging includes directly transferring the manufactured article from the additive manufacturing system to a heated enclosure, such as a furnace, without first requiring solutionizing the article (also referred to as solution heat treating). In some implementations of a heat treatment, the heated enclosure may be pressurized to perform hot isostatic pressing of the material.

Aging may comprise placing an as-built article in a heated environment at a temperature for a given period of time. In some instances, aging may be conducted at two distinct temperatures for two distinct times. Aging may be performed at various temperatures such as, for instance, 470° C. to 495° C.; at 473.5° C. to 490.5° C.; at 470° C. to 485° C.; or at 480° C. to 490° C. Aging may be performed for various lengths of time, such as 45 minutes to 2 hours; 1 hour to 2 hours; 50 minutes to 70 minutes; 60 minutes; or 45 minutes to 90 minutes. Other aging regimes are contemplated, such as H900, H1025, and H1050.

IV. Experimental Examples

Various experimental example alloys were fabricated or evaluated with modeling software, and the results are discussed below. In some instances, experimental example alloys were evaluated in comparison to commercially-available alloys.

As experimental examples, two Ar-atomized 100-kg powder heats were obtained. Specified target composition ranges and measured powder chemistries are provided in Table 1 below.

TABLE 1

Target composition, specified production ranges, and measured powder chemistries for manufactured example powders.

| | | Fe | Cr | Ni | C | Cu | Ti | Nb | N | O | Cr/Ni |
|---|---|---|---|---|---|---|---|---|---|---|---|
| Example Alloy 1 | Target (wt. %) | Balance | 15 (14.25-15.75) | 3.4 (2.9-3.9) | 0.05 (0.03-0.07) | 3.4 (2.9-3.9) | 0.15 (0.01-0.31) | <0.01 | <0.02 | <0.04 | 4.41 |
| | Measured (wt. %) | Balance | 15.05 | 3.5 | 0.06 | 3.4 | 0 | 0 | 0.01 | 0.03 | 4.30 |
| Example Alloy 2 | Target (wt. %) | Balance | 15 (14.25-15.75) | 4.5 (4.0-5.0) | 0.06 (0.04-0.08) | 4.0 (3.5-4.5) | — | <0.01 | <0.02 | <0.04 | 3.33 |
| | Measured (wt. %) | Balance | 15.13 | 4.3 | 0.05 | 3.9 | | <0.01 | 0.01 | 0.03 | 3.52 |

The example powders were subjected to various flow behavior and particle size distribution and compared to commercially available powders. Results are shown in Table 2 below.

TABLE 2

Comparing example alloy powders to commercially available powders.

| Material | Avalanche Angle | Hausner Ratio | Angle of Repose | Hall flow | % <15 μm | % porosity |
|---|---|---|---|---|---|---|
| Supplier A (Ar) | 22° | 1.10 | 32° | 19.3 | 0 | 0.27 (27) |
| Supplier B (Ar) | 28° | 1.06 | 30° | 21.5 | 0 | 0.33 (39) |
| Supplier C (Ar) | 37° | 1.21 | 40° | Did not flow | 0 | 1.44 (37) |
| Supplier C (N2) | 30° | 1.09 | 33° | 22.1 | 0 | 0.18 (19) |
| Example Alloy 1 | 36° | 1.09 | 28° | 22.1 | 0 | 0.33 (18) |

Figure 1A:
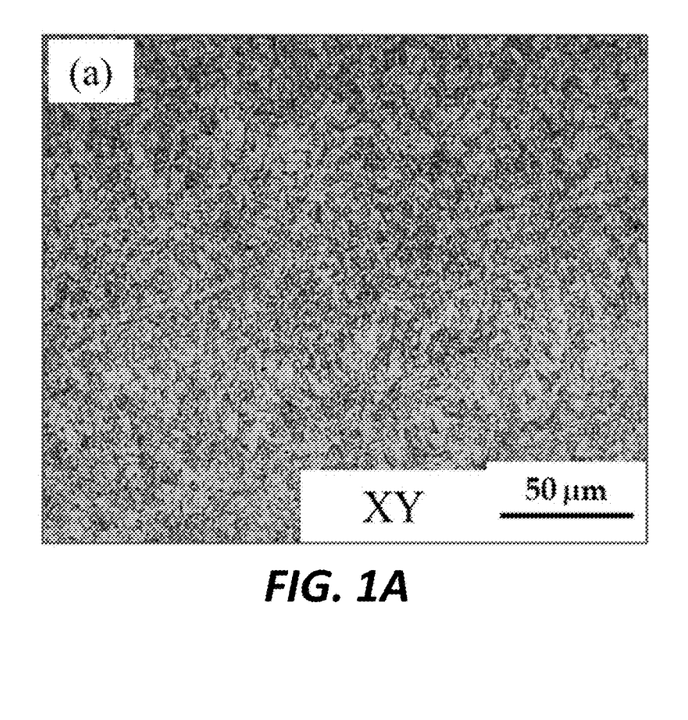
FIG. 1A is an optical micrograph of Example Alloy 1 in as built condition, taken parallel to the build plate (an xy specimen).
Figure 1B:
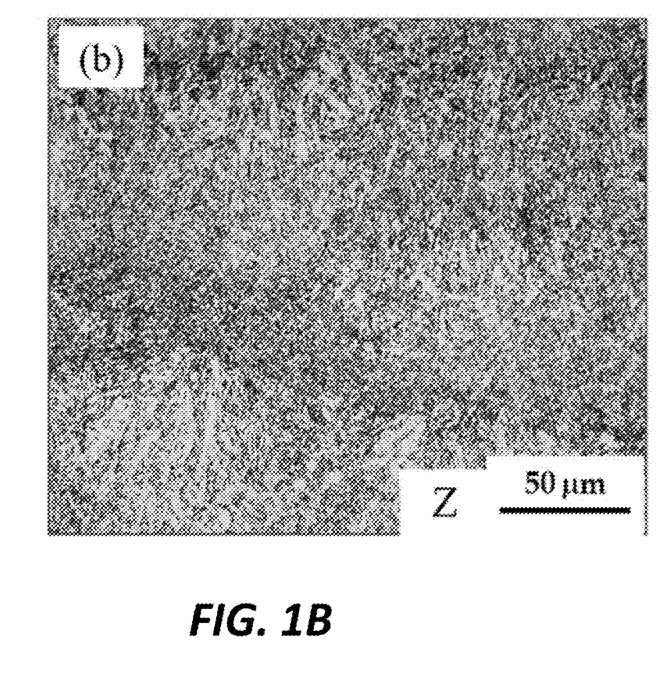
FIG. 1B is an optical micrograph of Example Alloy 1 shown in FIG. 1A, taken perpendicular to the build plate (a z specimen).
Figure 1C:
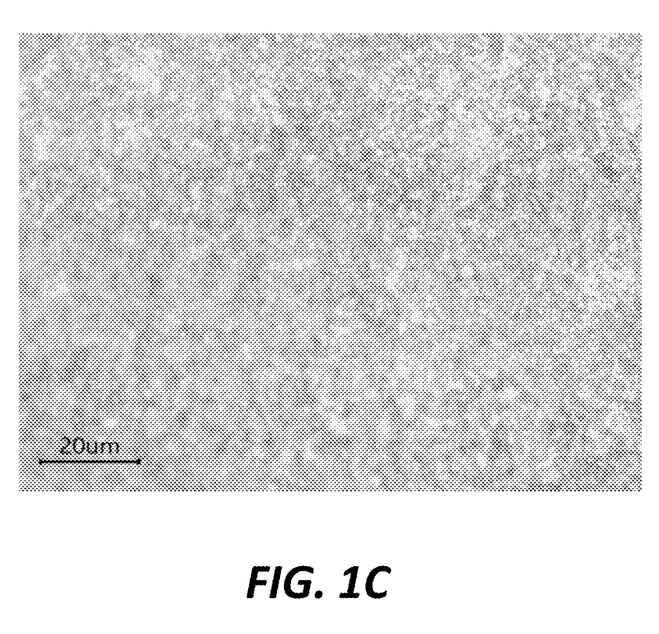
FIG. 1C is a higher magnification optical micrograph of Example Alloy 1 taken perpendicular to the build plate (a z specimen).
Figure 1D:
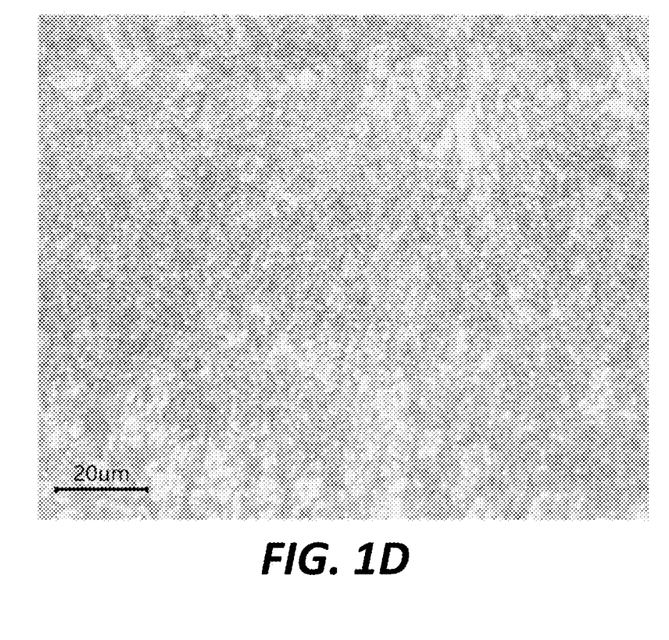
FIG. 1D is an optical micrograph of Example Alloy 2 taken perpendicular to the build plate (a z specimen).

Metallurgy specimens from example alloy powders and two commercial powders were characterized by optical and electron microscopy, X-ray diffraction and electron backscatter diffraction (EBSD). As-built, optical micrographs of Example Alloy 1 were obtained and are shown in FIG. 1A (xy specimen, parallel to the build plate), FIG. 1B (z specimen, perpendicular to the build plate), and FIG. 1C (z specimen, perpendicular to the build plate). As shown in FIG. 1A, FIG. 1B, and FIG. 1C, Example Alloy 1 has a primarily martensitic microstructure. FIG. 1D shows an optical micrograph of Example Alloy 2 in as built form (z specimen, perpendicular to the build plate). As shown in FIG. 1D, Example Alloy 2 has a primarily martensitic microstructure.

Figure 2:
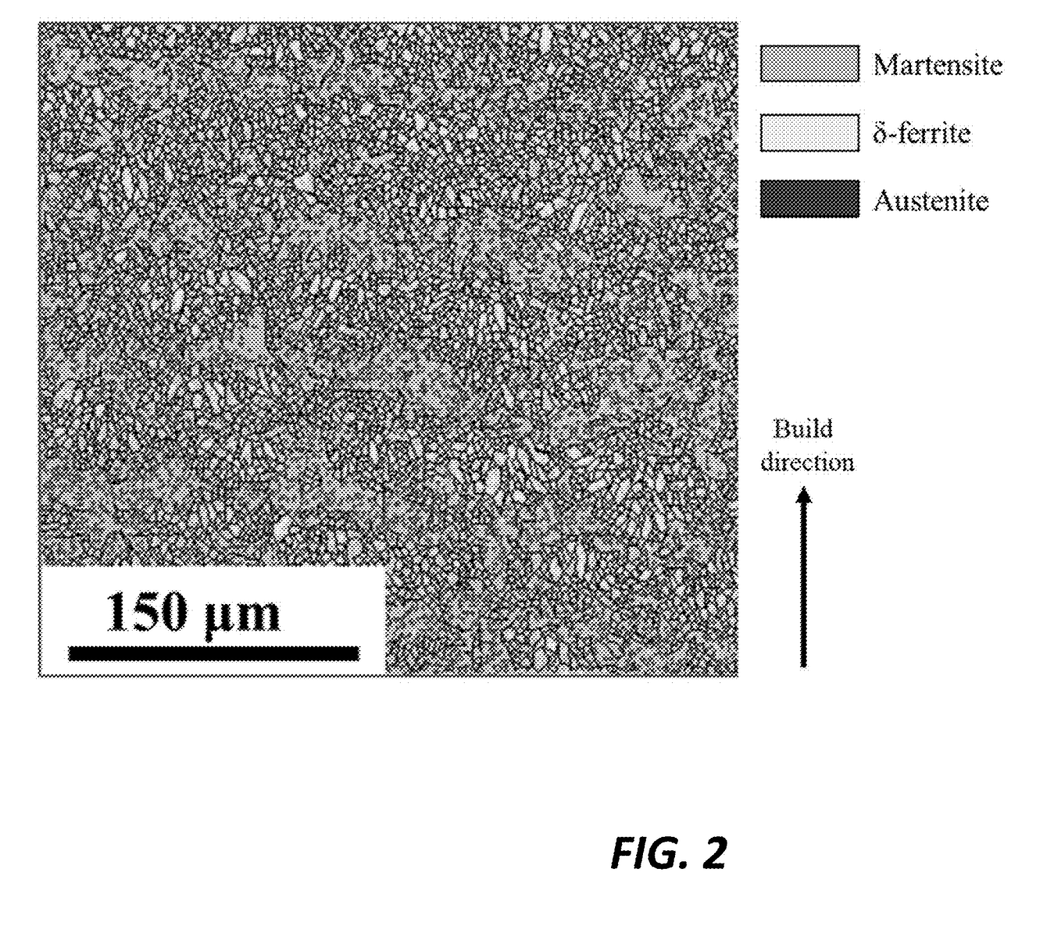
FIG. 2 is an electron backscatter diffraction (EBSD) image of Example Alloy 1 shown in FIG. 1A and FIG. 1B.

FIG. 2 shows an EBSD image used in phase analysis. Table 3 below shows the overall phase fractions of the as-built Example Alloy 1 and Example Alloy 2 as well as two commercial powders. Supplier A's alloy included 15.6 wt % Cr, 4.70 wt % Ni, 0.22 wt % sum of Nb and Ta, 0.01 wt % C, 0.036 wt % N, 3.61 wt % Cu, 0.5 wt % Mn, and 0.38 wt % Si. Supplier B's alloy included 16.12 wt % Cr, 4.15 wt % Ni, 0.2 wt % sum of Nb and Ta, 0.02 wt % C, 0.007 wt % N, 3.21 wt % Cu, 0.03 wt % Mn, and 0.79 wt % Si. As shown in Table 3, the as-built microstructure can vary widely within the 17-4 specification.

TABLE 3

Overall phase fractions of as-built Example Alloy 1, Example Alloy 2 (compositions shown in Table 1) and two commercial powders.

| Alloy | δ-ferrite (phase fraction, %) | Austenite (phase fraction, %) | Martensite (phase fraction, %) |
|---|---|---|---|
| Example Alloy 1 | 12 | 8 | 80 |
| Example Alloy 2 | 5 | 2 | 93 |
| Supplier A (Ar) | 20 | 3.7 | 75 |
| Supplier B (Ar) | 95 | <1% | 5 |

Figure 5:
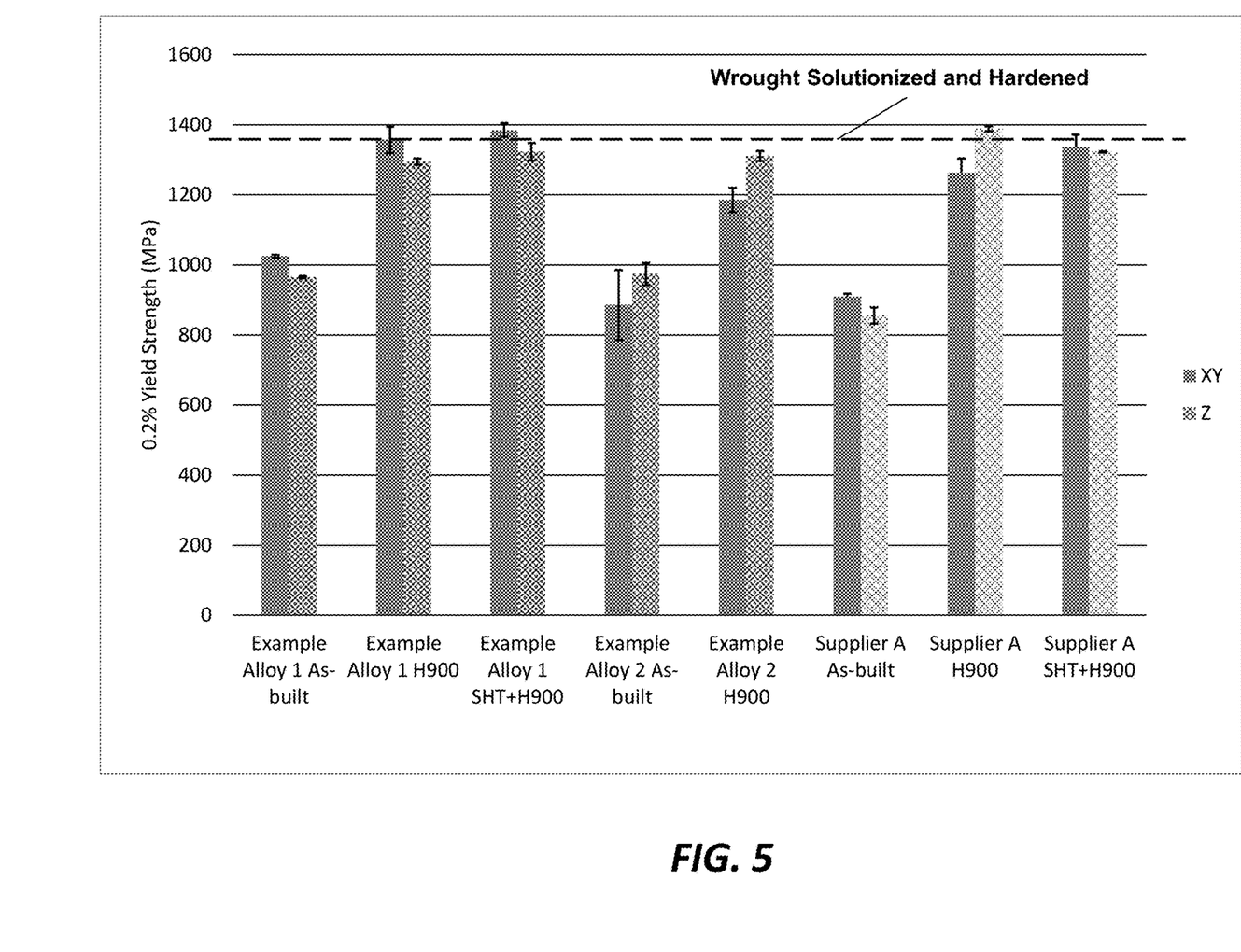
FIG. 5 shows experimental results for 0.2% yield strength of commercially available alloys, Example Alloy 1, and Example Alloy 2.
Figure 6:
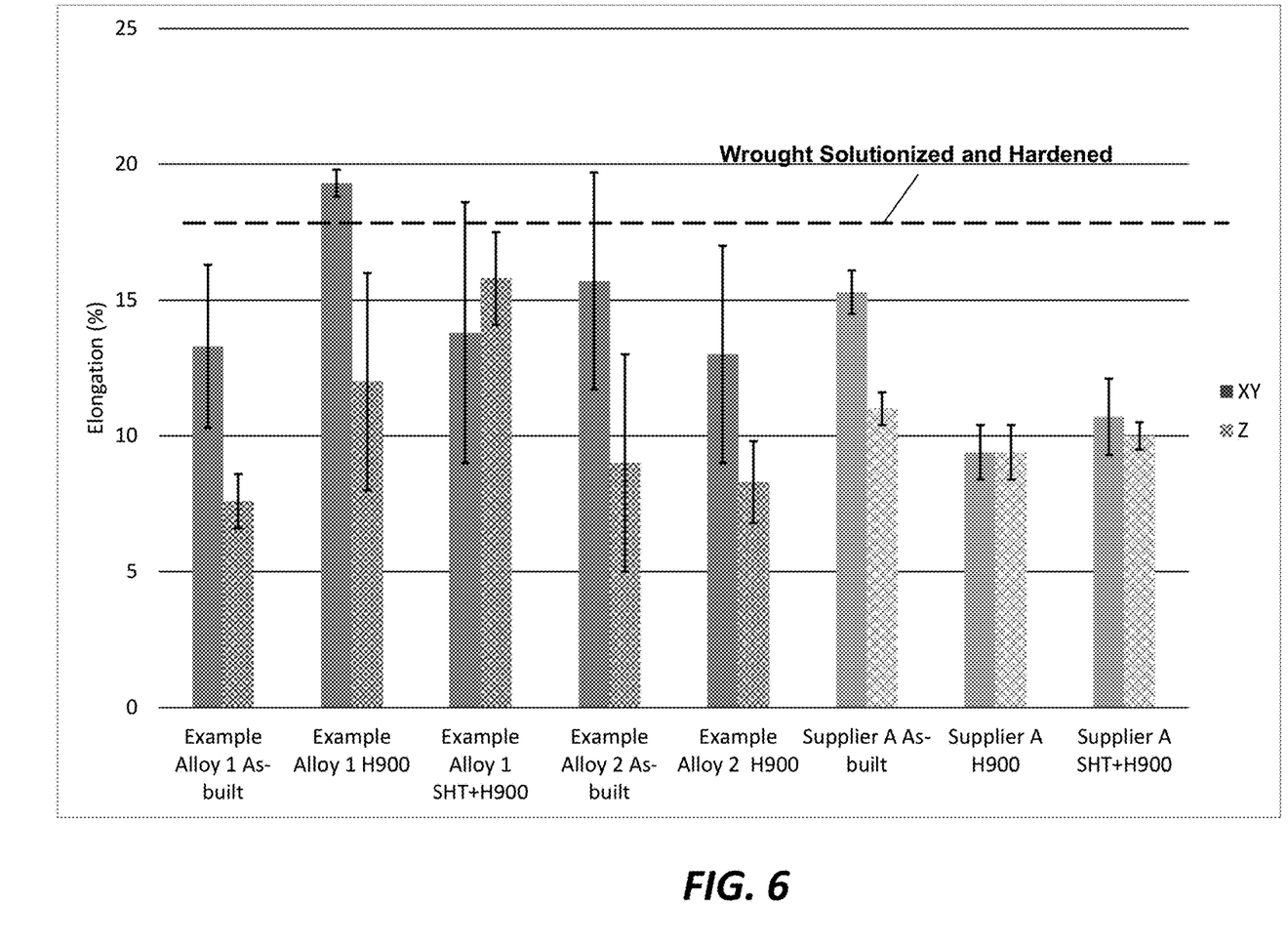
FIG. 6 shows experimental results for elongation of commercially available alloys, Example Alloy 1, and Example Alloy 2.

Tensile and hardness testing for Example Alloy 1 was also performed and the results are shown in Tables 4 and 5 below, and depicted graphically in FIG. 5 and FIG. 6. Experimental coupons were fabricated on an EOS M290 machine (available from EOS North America, Novi, Michigan) on a build plate preheated at 40° C. The build process included bidirectional beam scanning with a scan rotation angle of 67°. All coupons were produced using the same build parameters (195 W laser power, 750 mm/s scan speed, 0.1 mm hatch spacing and 40 μm layer thickness). Coupons fabricated from Ar-atomized powders were subjected to two heat treatments: 1) solutionize and H900 and 2) direct H900 harden without solutionizing. Using wire EDM flat "dog bone" test specimens were cut from as-built and heat-treated coupons. A bar of commercially available wrought 17-4 PH was procured for use as a baseline. As received, the wrought material is already solutionized (condition A). The long axis of tensile specimens was either parallel to the build plate (XY) or perpendicular to the build plate (Z) and tested in tension. Three tests were performed for each combination of powder and heat treatment following ASTM E8 (2016). Hardness for the non-Example Alloys was measured using a Shimadzu HMV-G Micro Vickers Hardness Tester and converted to HRC. Hardness values (Rockwell C hardness) for Example Alloy 1 and Example Alloy 2 was measured using a Wilson Instruments Rockwell 500 hardness tester.

TABLE 4

Tensile properties for Example Alloy 1 (Z specimen), Example Alloy 2 (Z specimen), wrought commercially available alloy (17-4 PH), and a commercially available alloy (Supplier A (Ar), Z specimen).

| Condition | Sample | Yield strength, 0.2% elastic offset (MPa) | Ultimate tensile strength (MPa) | Total elongation (%) |
|---|---|---|---|---|
| As-built | Example Alloy 1 | 965 ± 3 | 1221 ± 14 | 7.6 ± 1 |
| Hardened | Example Alloy 1 | 1294 ± 9 | 1414 ± 4 | 12 ± 4 |
| Solutionized and hardened | Example Alloy 1 | 1322 ± 25 | 1486 ± 30 | 15.8 ± 1.7 |
| As-built | Example Alloy 2 | 974 ± 31 | 1188 ± 18 | 9 ± 4 |
| Hardened | Example Alloy 2 | 1310 ± 14 | 1457 ± 2 | 8.3 ± 1.5 |
| Solutionized and hardened | Wrought 17-4 PH | 1371 ± 52 | 1523 ± 18 | 17.3 ± 1.2 |
| As-built | Supplier A (Ar) | 856 ± 23 | 917 ± 27 | 11 ± 0.6 |
| Hardened | Supplier A (Ar) | 1389 ± 7 | 1467 ± 11 | 9.4 ± 1 |
| Solutionized and hardened | Supplier A (Ar) | 1322 ± 2 | 1401 ± 9 | 10 ± 0.5 |

TABLE 5

Tensile properties for Example Alloy 1 (XY specimen), Example Alloy 2 (XY specimen), wrought commercially available alloy (17-4 PH), and a commercially available alloy (Supplier A (Ar), XY specimen).

| Condition | Sample | Yield strength, 0.2% elastic offset (MPa) | Ultimate tensile strength (MPa) | Total elongation (%) | Hardness (HRC) |
|---|---|---|---|---|---|
| As-built | Example Alloy 1 | 1025 ± 4 | 1149 ± 8 | 13.3 ± 3 | 39.4 ± 0.4 |
| Hardened (H900) | Example Alloy 1 | 1357 ± 38 | 1441 ± 43 | 19.3 ± 0.5 | 45 ± 0.2 |
| Solutionized and hardened | Example Alloy 1 | 1385 ± 20 | 1534 ± 16 | 13.8 ± 4.8 | |
| As-built | Example Alloy 2 | 886 ± 99 | 1151 ± 11 | 15.7 ± 4 | 36.4 ± 0.9 |
| Hardened (H900) | Example Alloy 2 | 1185 ± 35 | 1408 ± 12 | 13 ± 4 | |
| Solutionized and hardened | Wrought 17-4 PH | 1371 ± 52 | 1523 ± 18 | 17.3 ± 1.2 | 48.2 |
| As-built | Supplier A (Ar) | 910 ± 8 | 1084 ± 13 | 15.3 ± 0.8 | 34.5 |
| Hardened (H900) | Supplier A (Ar) | 1263 ± 40 | 1467 ± 11 | 9.4 ± 1 | 46.8 |
| Solutionized and hardened | Supplier A (Ar) | 1335 ± 36 | 1425 ± 40 | 10.7 ± 1.4 | 45.1 |

Figure 3:
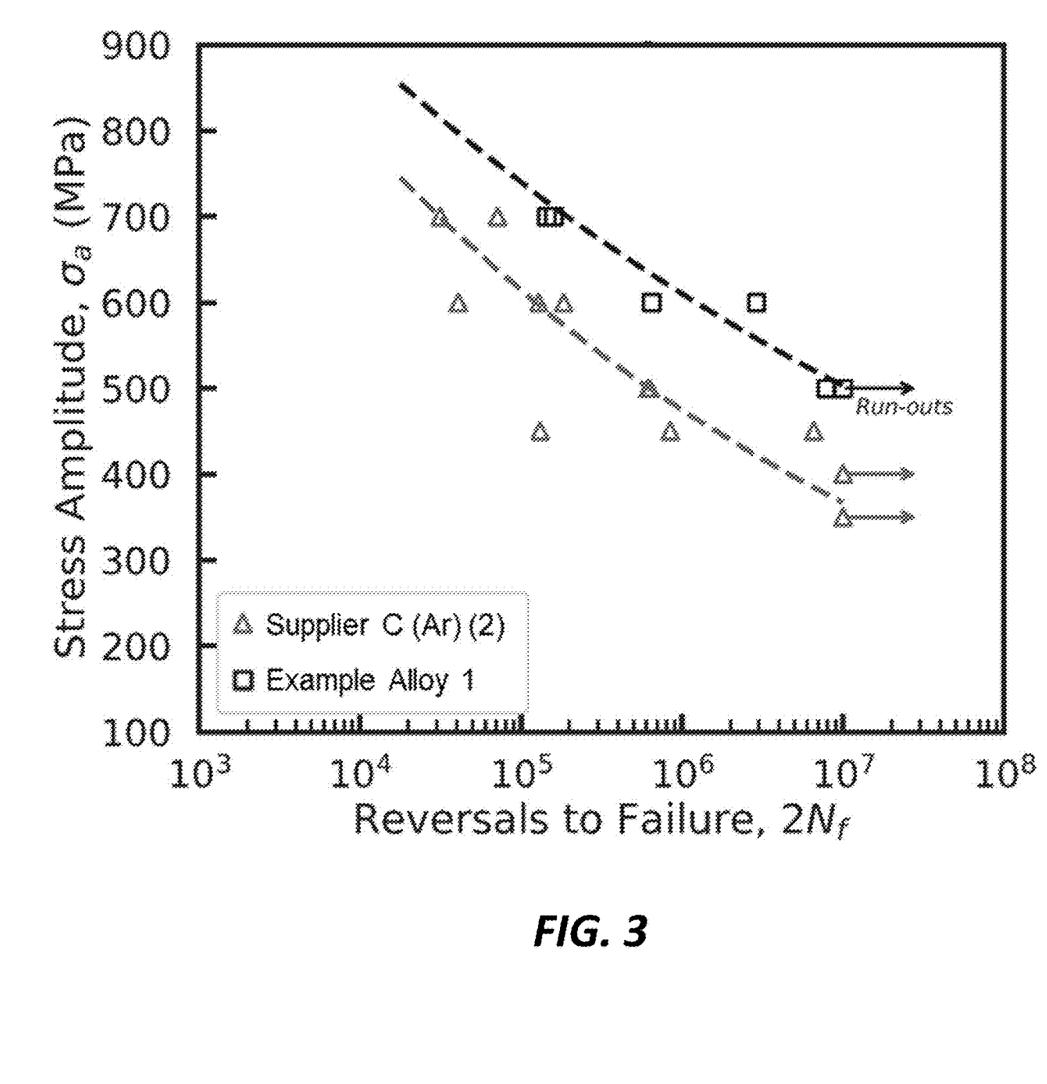
FIG. 3 shows a graph comparing fatigue performance of a commercially available alloy to Example Alloy 1, where both alloys are in the as-built condition.

Fatigue performance of a Supplier C (Ar) (2) alloy (15.6 wt % Cr, 4.03 wt % Ni, 0 wt % Mo, 0.33 wt % Nb+Ta, 0.01 wt % C, 0.01 wt % N, 3.89 wt % Cu, 0.24 wt % Mn, and 0.29 wt % Si, balance Fe) was compared to Example Alloy 1. ASTM E466-15 was used to test fatigue performance, where testing conditions had R=−1 (tested in fully reversible tension-compression state) and 10 Hz. Results of the as-built alloys are shown in FIG. 3 and indicate that Example Alloy 1 shows better fatigue performance at all stress amplitudes, and a higher fatigue limit at $10^7$ cycles compared to the Supplier C (Ar) (2) alloy.

Figure 4:
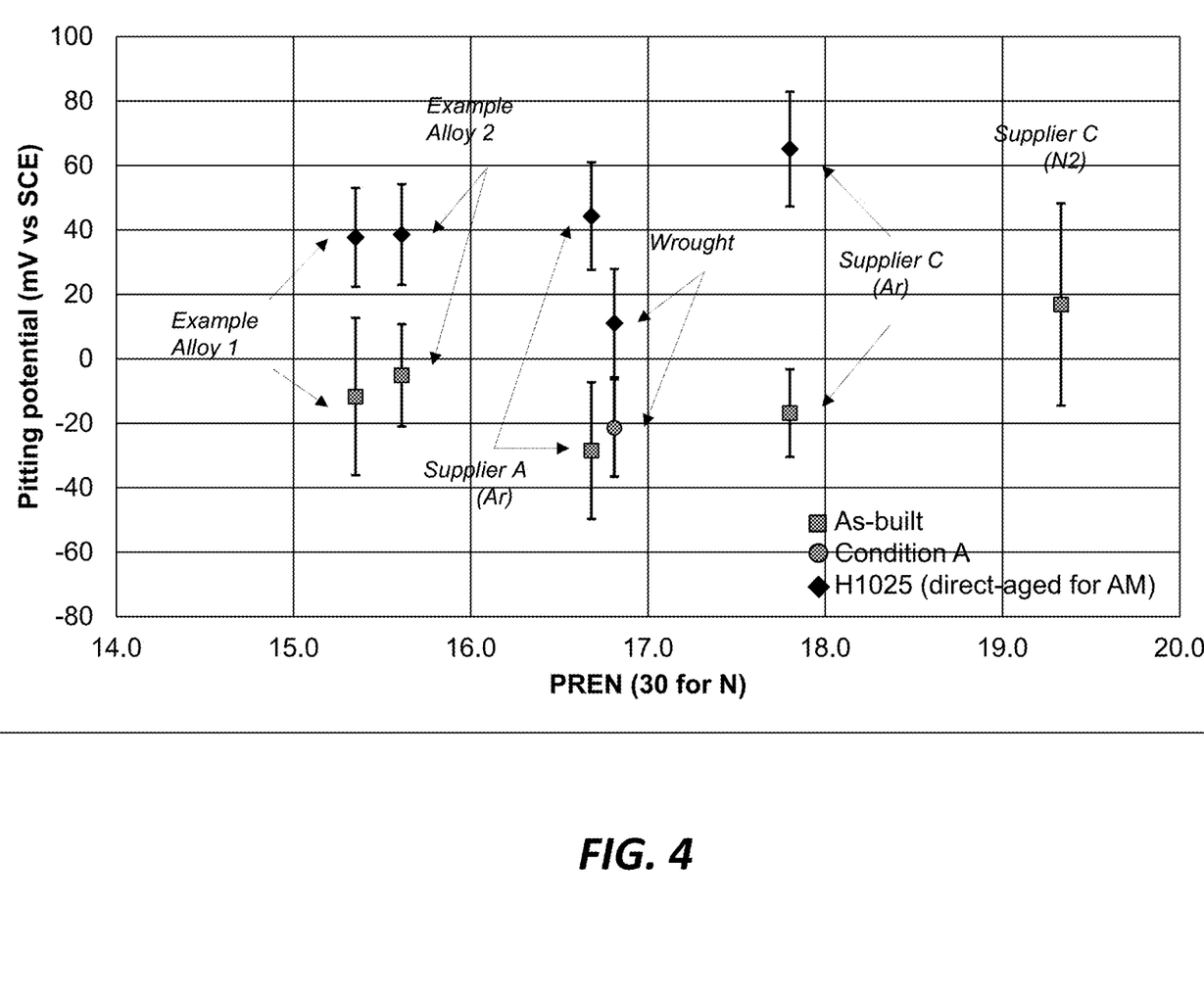
FIG. 4 shows a graph comparing pitting potential (Epit) and PREN of commercially available alloys, Example Alloy 1, and Example Alloy 2.

Corrosion tests were performed using the average of five potentiodynamic scans conducted using 0.5% NaCl solution and a 0.5 mV/s scan rate. Samples were left in open circuit condition for 30 minutes, and samples were first cathodically polarized at −1.1 VSCE (saturated calomel electrode) for 5 minutes to reduce any air-formed oxide film. Results are shown in FIG. 4 along with various commercial powders listed in Table 6 below. Various commercially available alloys were tested: Supplier A atomized under an argon atmosphere (Supplier A (Ar)), Supplier B atomized under an argon atmosphere (Supplier B (Ar)), Supplier C, which is a blend of 50% Supplier C alloy atomized under an argon atmosphere with 50% Supplier C alloy atomized under a nitrogen atmosphere (Supplier C (Ar/N2)), and Supplier C atomized under a nitrogen atmosphere (Supplier C $N_2$). Wrought 17-4 is shown as a baseline in FIG. 4. Results in FIG. 4 indicate that Example Alloy 1 and Example Alloy 2 have a relatively higher pitting potential as compared to the tested commercially available alloys in the direct-aged H1025 condition.

TABLE 6

Elemental compositions of commercially available alloys.

| | Fe | Cr | Ni | Mo | Nb + Ta | C | N | Cu | Mn | Si |
|---|---|---|---|---|---|---|---|---|---|---|
| Supplier A (Ar) | Balance | 15.6 | 4.7 | — | 0.22 | 0.01 | 0.036 | 3.61 | 0.5 | 0.38 |
| Supplier B (Ar) | Balance | 16.12 | 4.15 | — | 0.2 | 0.02 | 0.007 | 3.21 | 0.03 | 0.79 |
| Supplier C (Ar) | Balance | 16.7 | 4.29 | 0.05 | 0.27 | 0.01 | 0.031 | 4.49 | 0.20 | 0.36 |
| Supplier C (Ar/N$_2$) | Balance | 15.6 | 4.03 | <0.01 | 0.33 | 0.01 | 0.01 | 3.89 | 0.24 | 0.29 |
| Supplier C (N$_2$) | Balance | 15.5 | 4.55 | 0.26 | 0.24 | 0.05 | 0.099 | 4.5 | 0.7 | 0.76 |

For the recitation of numeric ranges herein, each intervening number there between with the same degree of precision is contemplated. For example, for the range of 6-9, the numbers 7 and 8 are contemplated in addition to 6 and 9, and for the range 6.0-7.0, the numbers 6.0, 6.1, 6.2, 6.3, 6.4, 6.5, 6.6, 6.7, 6.8, 6.9, and 7.0 are contemplated. For another example, when a pressure range is described as being between ambient pressure and another pressure, a pressure that is ambient pressure is expressly contemplated.

It is understood that the foregoing detailed description and accompanying examples are merely illustrative and are not to be taken as limitations upon the scope of the disclosure. Various changes and modifications to the disclosed embodiments will be apparent to those skilled in the art. Such changes and modifications, including without limitation those relating to the chemical structures, substituents, derivatives, intermediates, syntheses, compositions, formulations, or methods of use, may be made without departing from the spirit and scope of the disclosure.

What is claimed is:

1. An as-built alloy consisting of, by weight percentage:
   15.0% to 15.75% chromium;
   2.90% to 5.0% nickel;
   0.05% to 0.08% carbon;
   2.90% to 4.50% copper;
   no more than 0.01% niobium;
   no more than 0.02% nitrogen;
   no more than 0.04% oxygen;
   no more than 0.01% tantalum,
   no more than 0.1% silicon,
   no more than 0.5% manganese;
   no more than 0.31% titanium;
   the balance of weight percent comprising iron and incidental elements and impurities; and
   the as-built alloy having a hardness from 36 HRC to 40 HRC and a total elongation of no less than 10% and no greater than 16% in response to additive manufacturing using a laser power of 195 W, a scan speed of 750 mm/s, a hatch spacing of 0.1 mm, and a layer thickness of 40 µm, and without aging or solution heat treating.

2. The as-built alloy according to claim 1, wherein a ratio of nickel to copper is no less than 1.

3. The as-built alloy according to claim 1, consisting of, by weight percentage, 15.0% to 15.5% chromium, 2.9% to 3.9% nickel; 0.06% to 0.07% carbon, 2.9% to 3.9% copper; 0.05% to 0.25% titanium; about 0.01% nitrogen and about 0.03% oxygen.

4. The as-built alloy according to claim 1, consisting of, by weight percentage, 15.0% to 15.5% chromium, 4.0% to 5.0% nickel; 3.5% to 4.5% copper; and less than 0.01% titanium.

5. The as-built alloy according to claim 1, wherein the as-built alloy has been subjected to an additive manufacturing process and without aging, has a fatigue strength of 475 MPa to 525 MPa.

6. An as-built alloy consisting of, by weight percentage:
   15.0% to 15.75% chromium;
   2.90% to 5.0% nickel;
   0.05% to 0.08% carbon;
   2.90% to 4.50% copper;
   no more than 0.01% niobium;
   no more than 0.02% nitrogen;
   no more than 0.04% oxygen;
   no more than 0.01% tantalum;
   no more than 0.01% silicon;
   no more than 0.25% titanium;
   no more than 0.1% manganese;
   the balance of weight percent comprising iron and incidental elements and impurities; and
   the as-built alloy, when additively manufactured using a laser power of 195 W, a scan speed of 750 mm/s, a hatch spacing of 0.1 mm, and a layer thickness of 40 μm, and without aging or solution heat treating, having a hardness from 36 HRC to 40 HRC and a total elongation of no less than 10% and no greater than 16%.

* * * * *